United States Patent
Zywiak et al.

(10) Patent No.: US 9,126,687 B2
(45) Date of Patent: Sep. 8, 2015

(54) ENVIRONMENTAL CONTROL SYSTEM HAVING PARALLEL COMPRESSORS AND METHOD OF CONTROLLABLY OPERATING

(75) Inventors: Thomas M. Zywiak, Suffield, CT (US); Harold W. Hipsky, Willington, CT (US); Young K. Park, Simsbury, CT (US); Meade Ferrigan, Granby, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 320 days.

(21) Appl. No.: 13/412,080

(22) Filed: Mar. 5, 2012

(65) Prior Publication Data
US 2013/0230409 A1   Sep. 5, 2013

(51) Int. Cl.
*B64D 13/06* (2006.01)
*F04B 49/06* (2006.01)

(52) U.S. Cl.
CPC ........ *B64D 13/06* (2013.01); *B64D 2013/0603* (2013.01); *F04B 49/06* (2013.01); *F04B 49/065* (2013.01); *F04B 2205/10* (2013.01); *F04B 2205/11* (2013.01)

(58) Field of Classification Search
CPC .......... F04B 23/04; F04B 27/00; F04B 41/06; F04B 49/00
USPC .......... 417/22, 19, 20, 32, 43, 45, 44.11, 216, 417/427, 287
See application file for complete search history.

(56) References Cited

U.S. PATENT DOCUMENTS

| | | | | |
|---|---|---|---|---|
| 4,345,442 | A * | 8/1982 | Dorman | 62/160 |
| 5,347,467 | A * | 9/1994 | Staroselsky et al. | 700/282 |
| 5,743,714 | A * | 4/1998 | Drob | 417/2 |
| 5,908,462 | A * | 6/1999 | Batson | 701/100 |
| 7,453,224 | B2 * | 11/2008 | Sullivan | 318/433 |
| 7,497,265 | B2 * | 3/2009 | Ross et al. | 166/332.1 |
| 7,722,331 | B2 * | 5/2010 | Hirasawa et al. | 417/5 |
| 2006/0228221 | A1 * | 10/2006 | Heo | 417/2 |
| 2007/0130970 | A1 * | 6/2007 | Schwan et al. | 62/180 |
| 2008/0019842 | A1 * | 1/2008 | Coates et al. | 417/2 |
| 2009/0125257 | A1 * | 5/2009 | Jayanth et al. | 702/64 |

OTHER PUBLICATIONS

Emerson Process Management, Product Data Sheet, Performance monitoring—Steam Turbines, Jun. 2011.*

* cited by examiner

*Primary Examiner* — Devon Kramer
*Assistant Examiner* — Jon Hoffmann
(74) *Attorney, Agent, or Firm* — Cantor Colburn LLP

(57) ABSTRACT

An environmental control system having parallel compressors includes a first compressor driven by a first motor, the first compressor being operable for fluidly directing a first flow at a first flow rate through the first compressor. Also included is a second compressor driven by a second motor, the second compressor being operable for fluidly directing a second flow at a second flow rate through the second compressor. Further included is a monitoring component configured to compare the first flow rate to the second flow rate.

5 Claims, 2 Drawing Sheets

ENVIRONMENTAL CONTROL SYSTEM HAVING PARALLEL COMPRESSORS AND METHOD OF CONTROLLABLY OPERATING

BACKGROUND OF THE INVENTION

The present invention relates to environmental control systems, and more particularly such systems having parallel compressors and methods for operating the same.

Environmental control systems (ECS) are utilized on various types of aircraft for several purposes, such as air supply systems and/or cabin conditioning systems for the aircraft. For example, components of the ECS may be utilized to remove heat from various aircraft lubrication and electrical systems and/or used to condition aircraft cabin air. The cabin air conditioner includes one or more cabin air compressors (CACs) which compress air entering the system from an outside source or from a ram air system. The compressed air is delivered to an air cycle system and/or a vapor cycle system to bring it to a desired temperature then delivered to the aircraft cabin. After passing through the cabin, the air is typically exhausted to the outside. The CACs may be driven, for example, by air-cooled electric motors.

In an ECS utilizing two CACs, it is desirable to operate both CACs at relatively identical flow levels, known as operating at nearly identical operating points on a compressor map, or symmetrical operation. Failure to do so may result in various inefficient or undesirable operational characteristics, such as compressor surging, that can lead to unstable airflow. In an effort to monitor the operating points of the CACs, various sensors are employed. Inherent errors associated with the sensors may lead to uncertainty of operating points. Various other reasons lead to asymmetric operation, thereby causing inefficient and/or undesirable operation of the CACs.

BRIEF DESCRIPTION OF THE INVENTION

According to one embodiment, an environmental control system having parallel compressors includes a first compressor driven by a first motor, the first compressor being operable for fluidly directing a first flow at a first flow rate through the first compressor. Also included is a second compressor driven by a second motor, the second compressor being operable for fluidly directing a second flow at a second flow rate through the second compressor. Further included is a monitoring component configured to compare the first flow rate to the second flow rate.

According to another embodiment, a method of controllably operating parallel compressors is provided. The method includes driving a first compressor with a first motor. Also included is driving a second compressor with a second motor. Further included is directing a first flow into the first compressor. Yet further included is directing a second flow into the second compressor. Also included is monitoring a first power drawn by the first compressor by the first motor and a second power drawn by the second compressor from the second motor. Further included is adjusting at least one of the first flow and the second flow based on the monitoring of the first power drawn and the second power drawn.

According to yet another embodiment, a method of controllably operating parallel compressors is provided. The method includes directing a first flow through a first compressor, wherein the first flow enters a first compressor inlet at a first inlet temperature and exits a first compressor outlet at a first outlet temperature. Also included is directing a second flow through a second compressor, wherein the second flow enters a second compressor inlet at a second inlet temperature and exits a second compressor outlet at a second outlet temperature. Further included is monitoring the first inlet temperature, the first outlet temperature, the second inlet temperature and the second outlet temperature. Yet further included is calculating a first temperature difference and a second temperature difference. Further included is adjusting at least one of the first flow and the second flow based on the calculating the first temperature difference and the second temperature difference.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
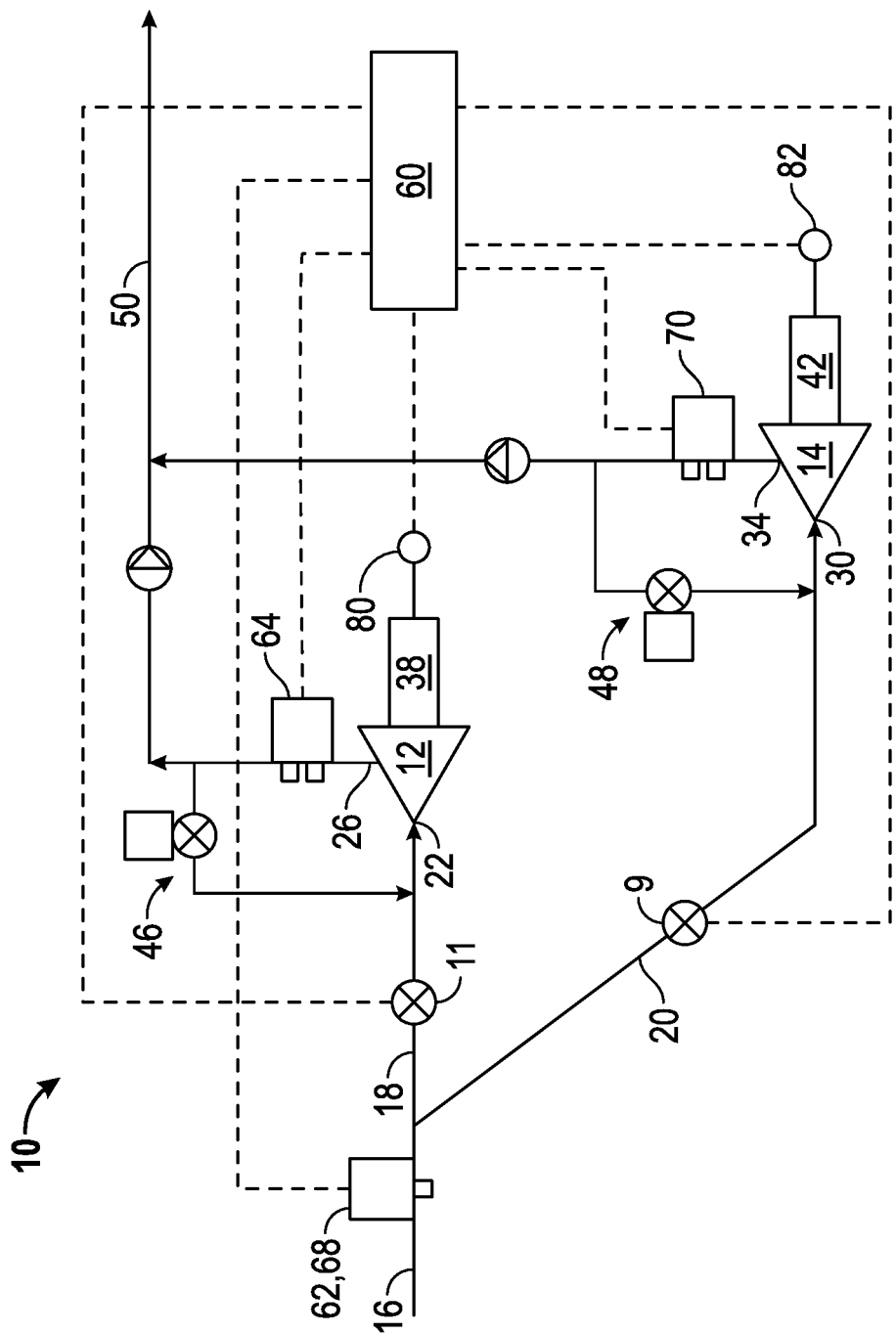
FIG. 1 is a schematic illustration of a parallel compressor system of an environmental control system.

Referring to FIG. 1, an environmental control system (ECS) is schematically illustrated and referred to by numeral 10. The ECS 10 is configured to condition air for various environments, such as an aircraft cabin. It is envisioned, however, that the ECS 10 may be used to condition numerous other environments and is not limited to use in the aircraft context.

The illustrated ECS 10 includes a plurality of cabin air compressors (CACs). In the illustrated embodiment, these CACs are shown as a first compressor 12 and a second compressor 14 and are operating in parallel. A main inlet airflow 16 is supplied via a source, such as an external source or provided internally by a ram air system, for example. The main inlet airflow 16 is diverted into two paths, resulting in a first flow 18 and a second flow 20 toward the first compressor 12 and the second compressor 14, respectively.

The first flow 18 enters the first compressor 12 via a first compressor inlet 22 at a first inlet temperature and exits the first compressor 12 via a first compressor outlet 26 at a first outlet temperature, traveling through the first compressor 12 at a first flow rate (i.e., compressor 12 fluidly directs the first flow 18 through the compressor 12). Similarly, the second flow 20 enters the second compressor 14 via a second compressor inlet 30 at a second inlet temperature and exits the second compressor 14 via a second compressor outlet 34 at a second outlet temperature, traveling through the second compressor 14 at a second flow rate (i.e., compressor 14 fluidly directs the second flow 20 through the compressor 14).

The first compressor 12 and the second compressor 14 are driven by a first motor 38 at a first input power and a second motor 42 at a second input power, respectively. The ECS 10 also includes at least one add heat valve (AHV), such as a first AHV 46 and a second AHV 48. The first AHV 46 is configured to recirculate air from a region proximate the first compressor outlet 26 to a region proximate the first compressor inlet 22, based on operational needs. Similarly, the second AHV 48 is configured to recirculate air from a region proximate the second compressor outlet 34 to a region proximate the second compressor inlet 30. Subsequent to passing through the first compressor 12 and the second compressor 14, the first flow 18 and the second flow 20 are directed to an air distribution system (not illustrated) either independently, or in combination, such as in a main outlet airflow 50, which is directed downstream to an air cycle system and/or a vapor cycle system, for example.

The ECS 10 includes a controller 60 for receiving a variety of information and is configured to perform numerous functions associated with operation of the ECS 10. One such function includes receiving data and controlling components associated with the flow levels of the first compressor 12 and the second compressor 14. A monitoring component may take the form of various embodiments, but it is to be appreciated that the monitoring component generally refers to a component of the ECS 10 that is employed to directly or indirectly monitor the flow level or rate of the first flow 18 and the second flow 20 as they pass through the first compressor 12 and the second compressor 14, respectively. The monitoring component is in operable communication with the controller 60 and provides the controller 60 with sufficient information to determine whether the first compressor 12 and the second compressor 14 are operating at relatively similar flow levels, and are said to be at nearly identical operating points a compressor map. Operating at nearly identical operating points indicates stable operation of the first compressor 12 and second compressor 14 and results in improved efficiency of the ECS 10. The controller 60 is configured to make adjustments to overall system parameters and/or components in the event the first compressor 12 and the second compressor 14 are not operating at a relatively similar flow level.

In one embodiment, the monitoring component is comprised of a plurality of temperature sensors. In the illustrated embodiment, a first temperature sensor 62 detects the first inlet temperature, a second temperature sensor 64 detects the first outlet temperature, a third temperature sensor 68 detects the second inlet temperature, and a fourth temperature sensor 70 detects the second outlet temperature. Each of the temperature sensors 62, 64, 68 and 70 are configured to relay to the controller 60 the respective temperatures detected.

In another embodiment, the monitoring component is comprised of a first motor power sensor 80 and a second motor power sensor 82. The first motor power sensor 80 monitors the power drawn by the first motor 38. The first input power refers to power exerted by the first motor 38 to power the first compressor 12. Similarly, the second motor power sensor 82 monitors the power drawn by the second motor 42, with the second input power referring to power exerted by the second motor 42 to power the second compressor 14. The first motor power sensor 80 and the second motor power sensor 82 are configured to relay to the controller 60 the power drawn by the motors 38, 42, respectively.

Figures 2, 3:
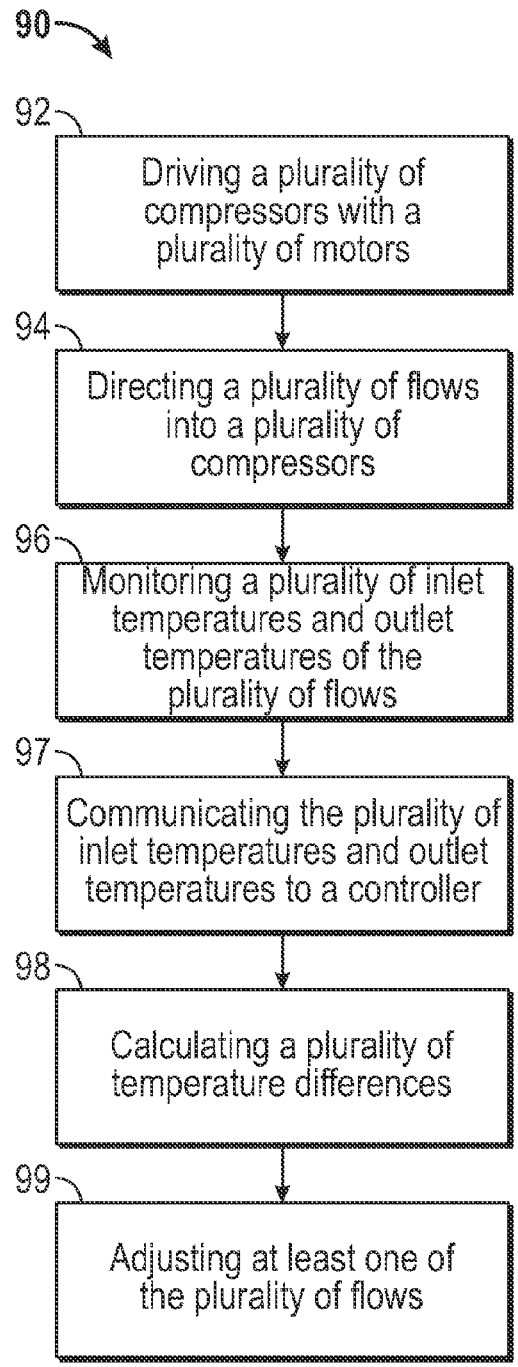
FIG. 2 is a flow diagram illustrating a method of operating the parallel compressor system according to a first embodiment.
FIG. 3 is a flow diagram illustrating a method of operating the parallel compressor system according to a second embodiment.

With reference to FIGS. 2 and 3, a method of controllably operating 90, 100, respectively, the ECS 10 (FIG. 1) is also provided. The ECS 10 has been previously described with reference to FIG. 1 and specific structural components need not be described in further detail. As described above, and with reference to FIG. 2, the method 90 includes driving 92 the first compressor 12 and the second compressor 14 with the first motor 38 and the second motor 42, respectively. The first flow 18 and the second flow 20 are directed 94 into the first compressor 12 and the second compressor 14, respectively. The first flow 18 and the second flow 20 enter the first compressor inlet 22 and the second compressor inlet 30, respectively, while exiting the first compressor outlet 26 and the second compressor outlet 34, respectively.

Also, a first embodiment of the monitoring component comprises the temperature sensors 62, 64, 68 and 70 for monitoring 96 the first inlet temperature, the first outlet temperature, the second inlet temperature and the second outlet temperature. The temperature sensors 62, 64, 68 and 70 then relay the respective temperatures to the controller 97, where a first temperature difference and a second temperature difference are calculated 98. Specifically, the first temperature difference refers to the difference between the first outlet temperature and the first inlet temperature, while the second temperature difference refers to the difference between the second outlet temperature and the second inlet temperature. A comparison of the first temperature difference and the second temperature difference indirectly provides the controller 60 with information pertaining to the flow levels of the first compressor 12 in comparison with the second compressor 14. Specifically, determination of a larger temperature difference (i.e., greater rise in temperature throughout compressor) indicates a lower flow level for the compressor. This is attributed to the fact that less energy is being passed through the compressor as flow. Such a lower compressor flow is indicative of a lower efficiency and produces a greater temperature rise throughout the compressor. By way of example, if the first flow 18 passing through the first compressor 12 is rising in temperature at a greater degree than that of the second flow 20 passing through the second compressor 14, it is reliably inferred that the flow level of the first compressor 12 is lower than that of the second compressor14, thereby resulting in asymmetric operation. In such a situation, the controller 60 adjusts 99 a flow influencer capable of achieving relatively similar flow levels for the first compressor 12 and the second compressor 14. The flow influencer may take the form of a variety of ECS 10 components, such as one or more variable diffusers or one or more valves, for example. The variable diffusers and valves are merely illustrative, and it is contemplated that numerous other components, singularly or in combination, may serve as the flow influencer to influence the flow level. An additional potential corrective action may include altering the compressor speed.

Referring now to FIG. 3, in the case of the second embodiment described above, the method 100 is performed in a similar manner, however, the motor input powers monitored 102 by the first motor sensor 80 and the second motor sensor 82 are employed to determine whether the flow levels of the first compressor 12 and the second compressor 14 are relatively similar. Here, subsequent to communicating the drawn motor powers to the controller 104, a detection of less motor power input to one compressor than the other indicates a lower flow level for the compressor. Similar to the first embodiment, such an indication prompts the controller 60 to initiate measures to achieve relatively similar flow levels for the first compressor 12 and the second compressor 14. The measures are similar to that of the first embodiment. Specifically, a flow influencer, such as at least one variable diffuser or at least one valve, is adjusted 99 to influence the flow to result in a relatively 50/50 split between the first compressor 12 and the second compressor 14.

Accordingly, the ECS 10 and the method for operating the ECS 10 provides the ability to reliably monitor the first flow 18 and the second flow 20 for a temperature and/or power divergence in the event of uneven flow to the first compressor 12 and the second compressor 14. Such an indication results in the adjustment of one or more components within the ECS 10 to achieve relatively similar flow levels.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An environmental control system having parallel compressors comprising:
  a first compressor driven by a first motor, the first compressor being operable for fluidly directing a first flow at a first flow rate through the first compressor;
  a second compressor driven by a second motor, the second compressor being operable for fluidly directing a second flow at a second flow rate through the second compressor, wherein the first compressor comprises a first compressor inlet and a first compressor outlet and the second compressor comprises a second compressor inlet and a second compressor outlet, wherein the first flow has a first inlet temperature and a first outlet temperature, wherein the second flow has a second inlet temperature and a second outlet temperature;
  a plurality of monitoring components configured to compare the first flow rate to the second flow rate, wherein the plurality of monitoring components comprises:
  a first temperature sensor for detecting the first inlet temperature, a second temperature sensor for detecting the first outlet temperature, a third temperature sensor for detecting the second inlet temperature, and a fourth temperature sensor for detecting the second outlet temperature; and
  a first motor power sensor and a second motor power sensor; and
  a controller configured to calculate a first compressor temperature difference, a second compressor temperature difference, an overall temperature difference based on a difference between the first compressor temperature difference and the second compressor temperature difference, and a compressor motor power difference; and
  a first flow influencer in operative communication with the controller and the first flow to modify the rate of flow of the first flow rate based on the overall temperature difference and the compressor motor power difference; and
  a second flow influencer in operative communication with the controller and the second flow to modify the rate of flow of the second flow rate based on the overall temperature difference and the compressor motor power difference; and
  wherein the controller is configured to control the first and second flow influencers.

2. The environmental control system of claim 1, further comprising a first add heat valve for providing at least a portion of the first flow from a region proximate a first compressor outlet to a region proximate a first compressor inlet.

3. The environmental control system of claim 2, further comprising a second add heat valve for providing at least a portion of the second flow from a region proximate a second compressor outlet to a region proximate a second compressor inlet.

4. The environmental control system of claim 1, wherein the first flow influencer and the second flow influencer comprises a variable diffuser.

5. The environmental control system of claim 1, wherein the first flow influencer and the second flow influencer comprises a valve.

* * * * *